Figure 5:
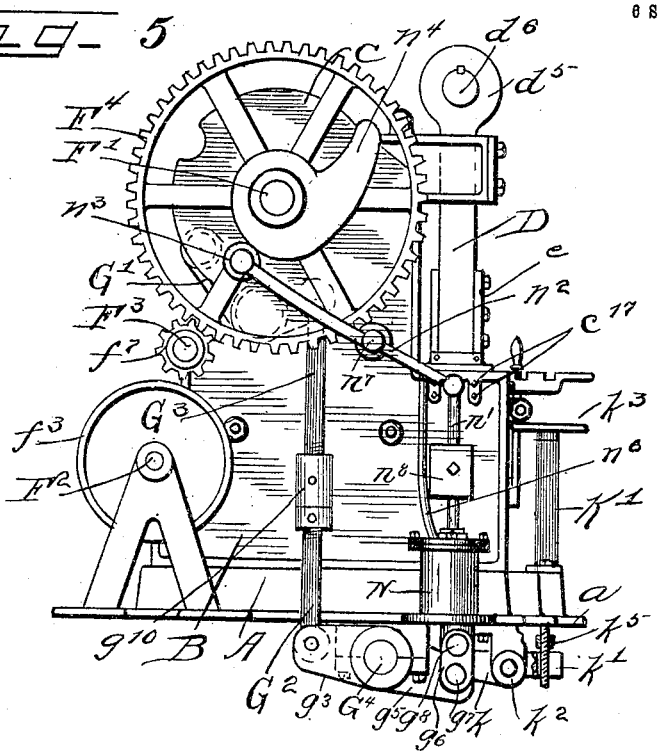

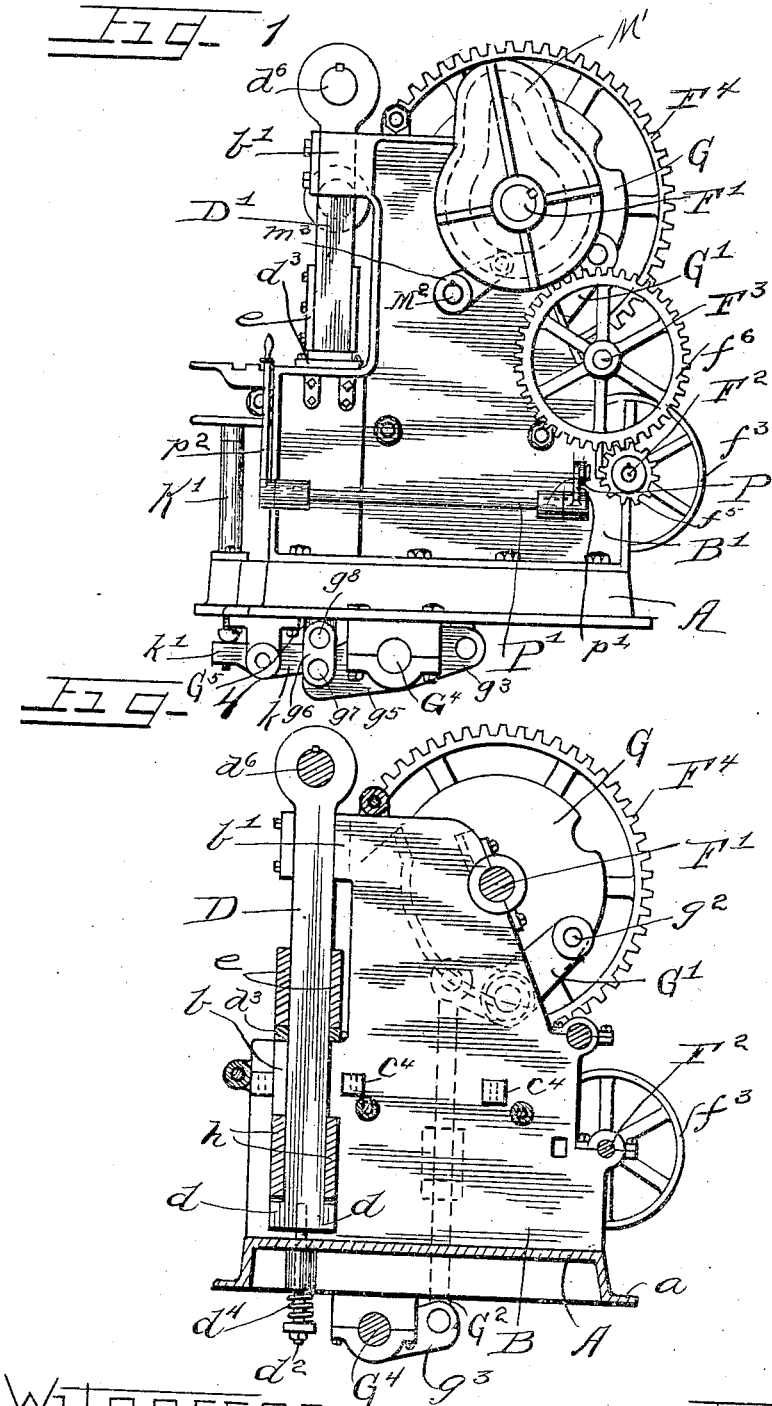

No. 835,566. PATENTED NOV. 13, 1906.
P. L. SIMPSON.
PRESS.
APPLICATION FILED DEC. 30, 1905.

6 SHEETS—SHEET 2.

Witnesses
J. W. Angell
W. W. Withenbury

Inventor
Peter L. Simpson
by Charles W. Hills Atty.

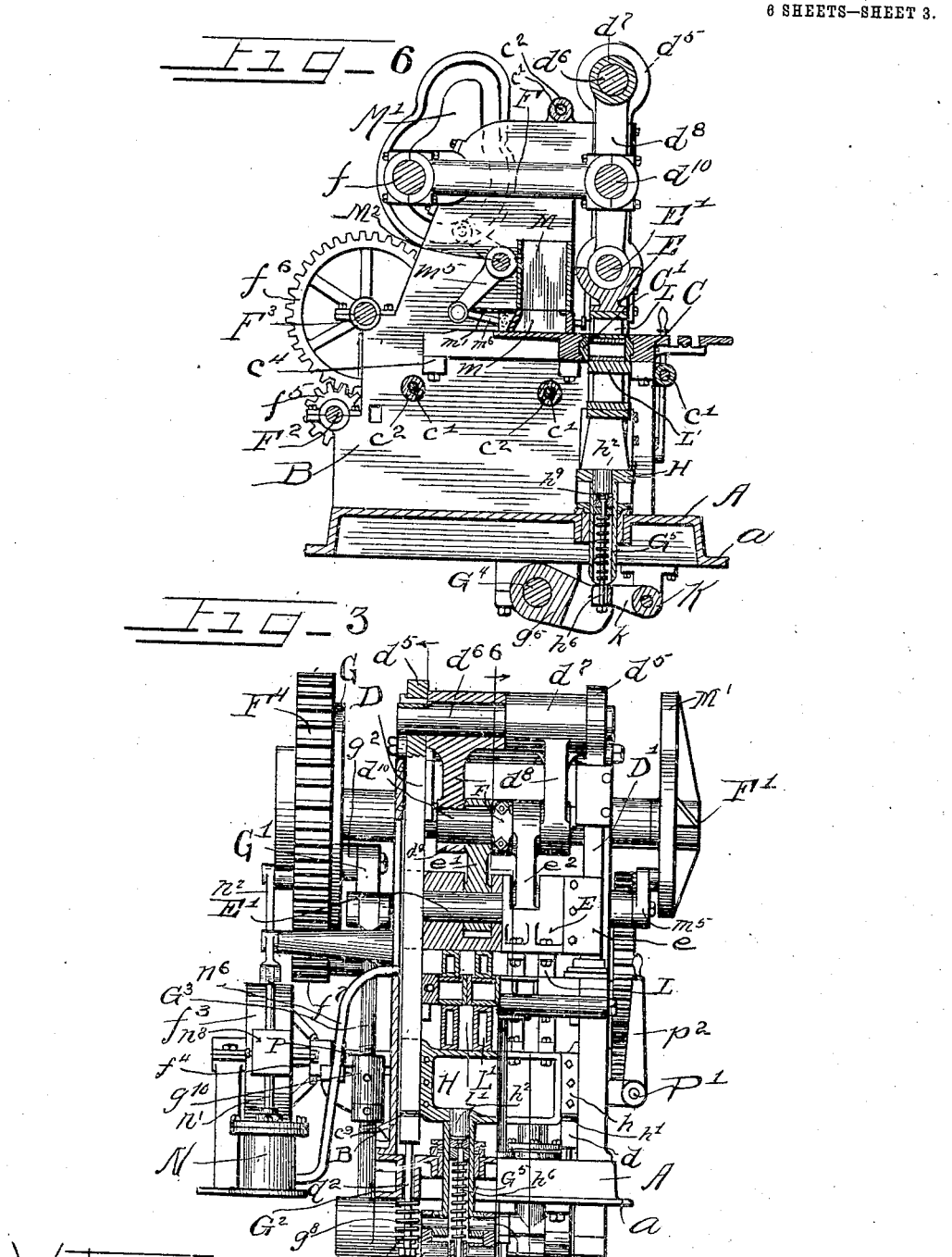

No. 835,566. PATENTED NOV. 13, 1906.
P. L. SIMPSON.
PRESS.
APPLICATION FILED DEC. 30, 1905.
6 SHEETS—SHEET 4.
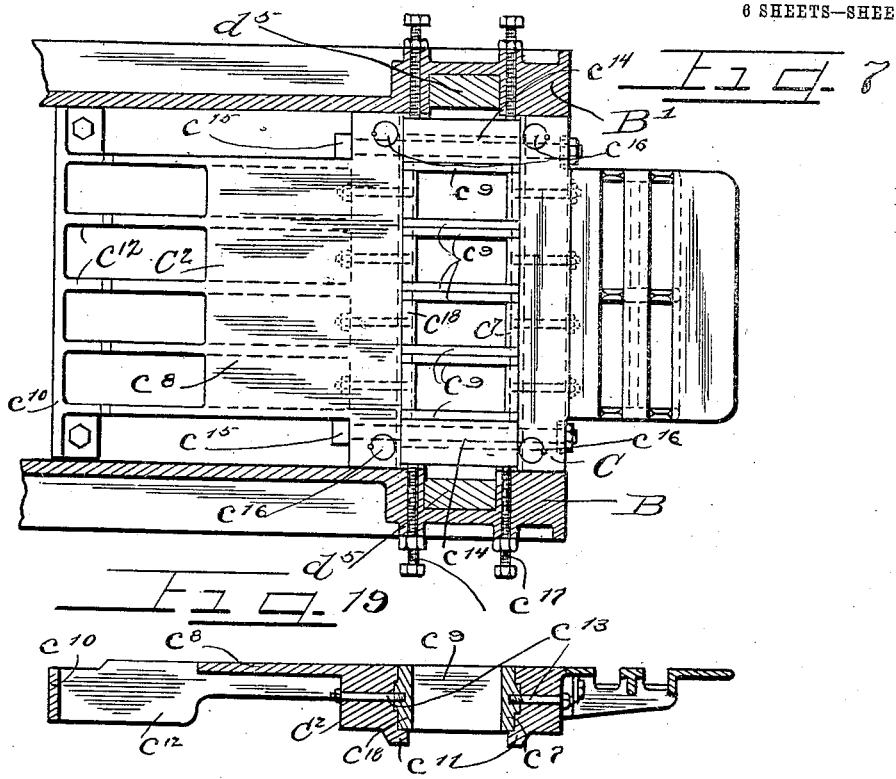
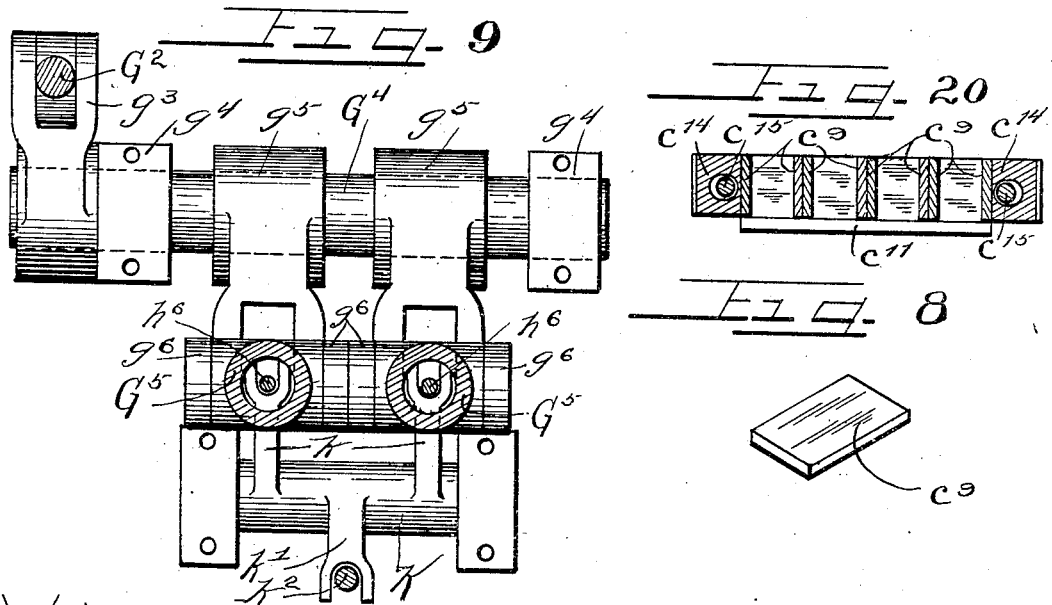
WITNESSES
J. W. Angell
W. W. Withenbury
INVENTOR
Peter L. Simpson
by Charles W. Hills Atty.

No. 835,566. PATENTED NOV. 13, 1906.
P. L. SIMPSON.
PRESS.
APPLICATION FILED DEC. 30, 1905.
6 SHEETS—SHEET 5.
FIG. 10
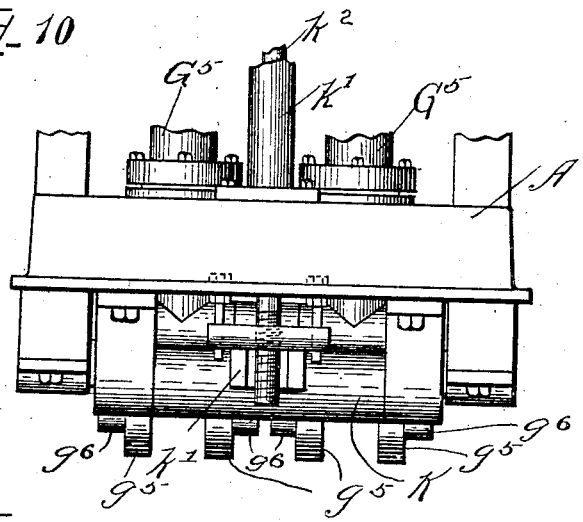
FIG. 11
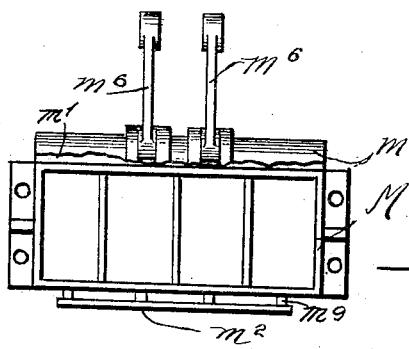
FIG. 13
FIG. 12
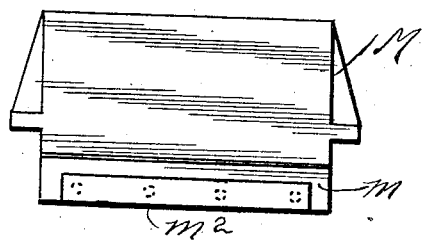
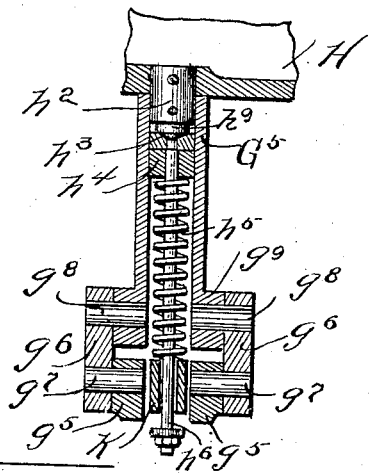
WITNESSES
J. H. Angell
W. W. Withenbury
INVENTOR
Peter L. Simpson
by Charles W. Hills Atty.

No. 835,566. PATENTED NOV. 13, 1906.
P. L. SIMPSON.
PRESS.
APPLICATION FILED DEC. 30, 1905.
6 SHEETS—SHEET 6.
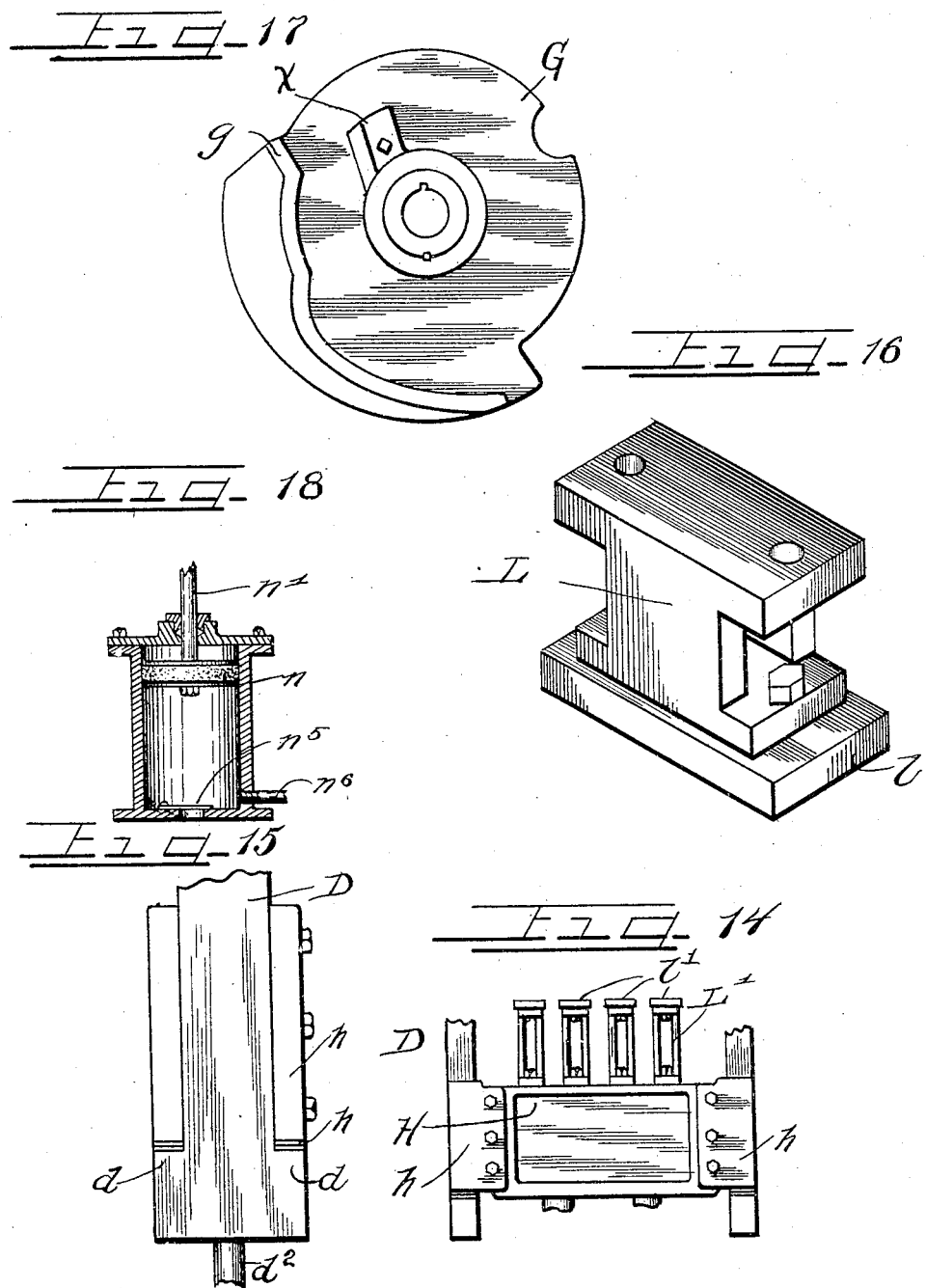

UNITED STATES PATENT OFFICE.

PETER L. SIMPSON, OF CHICAGO, ILLINOIS, ASSIGNOR TO HERBERT S. SIMPSON.

PRESS.

No. 835,566.   Specification of Letters Patent.   Patented Nov. 13, 1906.

Application filed December 30, 1905. Serial No. 293,891.

*To all whom it may concern:*

Be it known that I, PETER L. SIMPSON, a citizen of the United States, and a resident of the city of Chicago, in the county of Cook and State of Illinois, have invented certain new and useful Improvements in Presses, and more particularly a press in which the material is compressed by means of oppositely-reciprocating upper and lower plungers.

Many constructions of this class have been devised, and while these have proven more or less acceptable for molding brick of clay they are unsatisfactory for sand, lime, and cement bricks, owing to the difference in character of material and the fact that excessive pressure is required to produce the requisite compression of the material in the mold. Furthermore, the sand employed soon cuts away the mechanism unless means are provided for protecting the operating parts. Also the mechanisms for reciprocating the lower plungers in machines of this class as usually constructed are not well suited to operate upon material such as sand and lime.

The object of this invention is to construct a press adapted for use in molding brick of any kind, and particularly of sand, lime, or cement brick, rapidly and in large quantities and for this purpose to provide a feed-magazine and charger adapted to automatically supply the mold when the machine is in operation and also embracing automatic means whereby the lodgment of any excess of material on the mechanisms is prevented.

It is a further object of the invention to so construct the mechanism for operating the lower plungers that when pressure is applied the maximum pressure is attained somewhat more gradually than is usually true of those machines used for molding ordinary brick.

It is a further and important object of the invention to provide novel means for adjusting the reciprocating plungers relative to the molds with the utmost precision and in the least possible time and while the machine is in operation and whereby the operator can at will control the degree of compression and the thickness of the molded blocks or brick.

The invention also has for an object a construction whereby the molds can be quickly removed from the machine, changed, or adjusted without interfering with any other part of the machine.

The invention consists in the matters hereinafter described, and more fully pointed out and defined in the appended claims.

Figure 2:
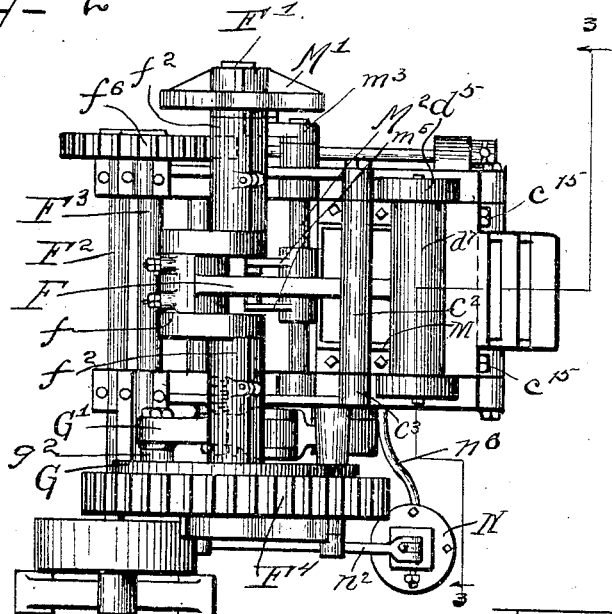

In the drawings, Figure 1 is a side elevation of a machine embodying my invention, taken on the side opposite the master-gear. Fig. 2 is a top plan view of the same. Fig. 3 is a view partly in front elevation and partly in section on line 3 3 of Fig. 2. Fig. 4 is a section taken on line 4 4 of Fig. 3. Fig. 5 is a view in elevation of the side opposite that shown in Fig. 1. Fig. 6 is a section taken on line 6 6 of Fig. 3. Fig. 7 is an enlarged fragmentary detail of the mold, showing the same removed from the machine. Fig. 8 is a perspective view of one of the parts of the mold. Fig. 9 is an enlarged top plan fragmentary detail of a part of the adjusting and reciprocating mechanisms for the lower plunger. Fig. 10 is an enlarged front elevation of the same. Fig. 11 is an enlarged fragmentary top plan view of the magazine. Fig. 12 is a front elevation of the same. Fig. 13 is a fragmentary central vertical section of a part of the reciprocating mechanisms for the lower plunger. Fig. 14 is a fragmentary front elevation showing the lower plunger removed from the machine. Fig. 15 is a fragmentary view of one of the side bars. Fig. 16 is a perspective view of one of the dies. Fig. 17 is an inner face view of the cam for actuating the lower plunger. Fig. 18 is a vertical section of the pump. Fig. 19 is a longitudinal section of the mold-table. Fig. 20 is a transverse section of the mold-table.

As shown in said drawings, the frame of the press comprises a base-plate A, flanged downwardly, as shown, at the sides and ends and outwardly at the bottom to afford attachment with the foundation upon which the machine is secured by means of bolts secured in the outwardly-directed flanges $a$. Rigidly bolted on each side of said base-plate are side frame members B and B', which are rigidly secured together at their front side by means of horizontal tie-bolts $c'$, on each of which is a sleeve $c^2$, the ends of which bear against the side frame members or bosses $c^3$ on the side frame members. As shown also within the frame and in position to support the rear and inner end of the mold-table C is a boss $c^4$, which projects beneath the mold-table.

Slidably secured in suitable bearings at the front edge of each side frame member is a side bar D D'. The upper end of each side bar extends above the frame and is enlarged to receive a shaft $d^6$. The lower ends of said side bars extend to near the base-plate and are provided on each edge with laterally-directed shoulders $d$. Said side bars are each also, as shown, provided centrally in its lower end with a downwardly-extending bolt or rod $d^2$, which is threaded at its lower end to receive a nut and which acts to hold a washer and spring $d^4$ firmly into bearing on the under side of the bed-plate A, through which said rod passes. Also adjustably secured on each of said side bars is a collar $d^3$, which is engaged to the frame and affords one of the bearings for the side bar. The lower ends of said side bars normally extend to or near the bed-plate, and said springs $d^4$ are secured thereon and bear against the lower side of the bed-plate to afford a resilient resistance against any lifting tendency of said side bars and to force down the side bars after pressure is released. Said shaft $d^6$ is non-rotatively secured in the upper ends of said side bars, the ends of which, $d^5$, are enlarged to receive said shaft, and secured on said shaft is a bearing-sleeve $d^7$, which fits closely between the heads of said side bars and is provided near each end with parallel forwardly and downwardly directed arms $d^8$, as shown in Figs. 3 and 6. Said arms are each at their outer or free end provided with enlarged ends or heads $d^9$, apertured in alinement and parallel with the shaft $d^6$ and in which is secured a shaft $d^{10}$ of a length less than the distance between the side bars and is preferably sufficiently smaller than the aperture therefor in said arms to permit a little play vertically, as shown in Fig. 3.

Above the mold-table C is the reciprocating die-head E, which, as shown, is provided on each end at each side of the same with parallel guide-plates $e$, which engage said side bars therebetween, upon which said head reciprocates. Journaled in said head is a shaft E', parallel with the shafts $d^6$ $d^9$ and upon which the lower ends of the arms $e'$ and $e^2$ are journaled, while the upper ends of said arms are journaled on the shaft $d^9$ between the arms $d^8$ and are a loose fit thereon, as before described. Said head is reciprocated by a connecting-rod F, the forward end of which is journaled on the shaft $d^{10}$ between the arms $e'$ $e^2$ and the rear end of which is journaled upon a crank $f$, approximately at the middle of a crank-shaft F'. Said crank-shaft is journaled transversely near the top of said side frame members and in relatively long bearings or boxes $f^2$ to protect the same from dust and dirt and to insure precision of movement. Said crank-shaft F' is driven from a main driving-shaft F², journaled on the rear side of the frame and provided with a belt-pulley $f^3$, operated either as a tight or a loose pulley by means of a suitable clutch $f^4$ of any suitable kind. On the opposite end of the shaft is provided a pinion $f^5$, which meshes with a gear $f^6$ on a shaft F³ parallel therewith and which at the opposite end is provided with a pinion $f^7$, which intermeshes with a master-gear F⁴ of relatively large size and secured on the end of said crank-shaft F' and from which the mechanism is timed and operated. Rigidly secured on said crank-shaft F' and between the master-gear F⁴ and the frame is a cam-wheel G, having an inwardly-directed cam-face $g$, which approaches the center of the cam, affording an inward throw, and for a part of its length near its inner end is at unvarying radial distance from the center and at its inner end terminates abruptly. Journaled on the side frame member B is a bell-crank, (shown in dotted lines in Fig. 5 and indicated by G') the upper or rear end of which is provided with a cam-roller $g^2$, which tracks on said cam-face. Pivotally engaged at the opposite end of said bell-crank is a connecting-rod constructed in two sections G² and G³, oppositely threaded at the adjacent ends, which are engaged together by a complementally-threaded coupling $g^{10}$ to afford adjustment as to length. The lower end of the connecting-rod is pivotally connected with a crank $g^3$, rigidly secured on a shaft G⁴, journaled beneath the frame, and directed oppositely from the arm or crank $g^3$ are parallel crank-arms $g^5$. Each of said arms $g^5$ is yoked at its end to afford a relatively broad longitudinal slot extending vertically therethrough, and, as shown, plates or links $g^6$ are pivotally secured on the outer sides of each of said arms at its extremities by means of a shaft or pin $g^7$, extending through said link and the arm. Said links extend upwardly above the arm and are pivotally secured by means of like pins or shafts $g^8$ on the lower laterally-extended ends $g^9$ of tubular supporting members G⁵, which bear against the under side of the lower die-head H, as shown in Figs. 3 and 13. Said lower die-head H, as shown, is provided at each end on each side thereof with guide-plates $h$, which slidably engage on the opposite sides of the side bars and which on their lower ends are supported on the laterally-directed shoulders $d$ of said side bars or upon the adjusting-plate $h'$, interposed between said shoulders and guide-plates, as shown in Figs. 3 and 15, should the same be required. Rigidly secured in the bottom of each of said lower die-heads H, as shown in Figs. 3 and 6, and extending downwardly therefrom and into and rigidly secured to each of the tubular supporting-standards G⁵ is a cylindric boss $h^2$, having a resilient pad $h^9$ on the lower end thereof, and bearing against said pad within said tubular member is a rod $h^6$, at the upper end of which is a rigidly-secured head comprising blocks $h^3$ and $h^4$, the upper of which is riveted on the upper end of said rod. Said rods pass through the slotted parallel ends $k$ of a bell-crank K, and each is provided below said arm with a nut and washer adapted to engage beneath said arm. A strong coiled spring $h^5$ is engaged on said rod $h^6$ and bears against the head thereof and extends downwardly and bears upon the ends $k$ of said bell-crank.

A tubular standard K' is secured upon the front end of the base-plate A, and rotative therein is a shaft $k^2$, threaded at its lower end and provided at its upper end with a hand-wheel $k^3$ and which extends through the yoked end of the arm $k'$ of the bell-crank K, which is directed oppositely from the arms $k$. A nut $k^5$ complemental with the threaded end of the shaft $k^2$ bears upon said yoked end $k'$ of said bell-crank, whereby rotation of said shaft varies the pressure of said arms $k$ on the springs $h^5$, which are adapted to yieldingly support the die-head H in its descent after having been elevated and which are adapted to be adjusted by said shaft and bell-crank to support the head at the proper height for charging.

The mold-table and the molds, as shown more fully in Fig. 7, embrace a forward cast-metal section C and a rear section $C^2$, between which are the molds. As shown, said forward section is of a length to fit between said side frame members and of a width to extend approximately flush with the outer edge thereof and inwardly approximately to the dies and is provided with forward extensions beyond the side frame members, which are grooved transversely of the table to receive the pallets upon which the bricks are removed from the machine. The rear side of said front section of the mold-table is shaped to provide a central longitudinal groove in its end complemental with the ribbed face of the front wall members $c^7$ for the mold and below which is an inwardly-projecting shoulder $c^{11}$, on which the parts forming the molds rest when being adjusted.

The rear section $C^2$ of the mold-table is constructed similarly with the rear end of the front section on its front face and is extended rearwardly to afford a flat table $c^8$, from which, as shown, rearwardly-directed integral bars $c^{12}$ extend, which are connected at their rear ends with a transverse bar $c^{10}$, the ends of which are supported upon and bolted to lugs $c^4$ integral with the side walls of the frame. Ribbed end blocks $c^{18}$, corresponding with the end blocks $c^7$ and affording the ends of the molds rest on the shoulder $c^{11}$. Said mold end blocks $c^7$ and $c^{18}$ are secured to the mold-table sections by means of stud-bolts $c^{13}$, which project from the rear faces of said blocks and through apertures in said sections and are provided with nuts on their outer ends, whereby the end blocks are firmly engaged in place. Plates of metal $c^9$ fit between said end blocks $c^7$ and $c^{18}$ and divide the space between said front and rear mold-table section into open spaces or molds corresponding in number with the dies on the die-heads. As shown, also a filler-block $c^{14}$ is provided at each side of the mold and fits closely between said sections of the mold-table and closely adajcent the side frame member, and the structure thus formed is rigidly bolted together by means of longitudinal bolts $c^{15}$, which extend through the front and rear sections at the side thereof and through slots or laterally-enlarged apertures in the filler-blocks and rigidly bind all parts together, though permitting the filler-blocks $c^{14}$ to be adjusted inwardly by means of the adjustment-screws $c^{17}$, extending through the side frame members, two on each side of each side bar and bearing against said filler-blocks. The table is adjusted to bring the molds in register with the dies and is secured to the frame by bolts extending through the holes $c^{16}$ in the table and is capable of being wholly removed by removing said bolts.

The press for convenience is shown as a four-mold press, though obviously it may be constructed to make any desired number of brick at an operation, and rigidly bolted upon the upper die-head are dies L, having a removable die-plate $l$ thereon, having a bottom area and form corresponding with the face of the brick or block to be molded. The lower die-head is similarly provided on its upper face with die-blocks L', which, as shown in Fig. 3, are constructed hollow and upon the upper face of which is secured a die-plate $l'$ of a size to exactly fit the mold.

Means are provided for automatically delivering the material to the mold, and for this purpose, as shown, a hopper M is supported at the rear of the upper die-head on the side walls and in close proximity with the upper dies and is open at the top to receive the material thereinto from any suitable conveyer. Said hopper is provided at its bottom with a charger $m$ of a depth sufficient to contain a charging for all of said molds and, as shown, is provided at the rear side and upper edge with a rearwardly-directed plate $m'$ of a width and length corresponding approximately with the width and length of the hopper and adapted to close the bottom of the same when the charger is moved forwardly. Said charger is also provided on its front with forwardly-projecting studs $m^9$ in alinement and on which is secured a thin horizontal strip of metal $m^2$, which engages flat against the bricks and pushes them forwardly while charging. The charger is actuated, as shown, by a cam M', secured on the end of the shaft F' opposite the master-gear and which is provided on its inner face with a cam-groove, in which engages one end of a bell-crank $m^3$, secured on the outer end of the shaft $M^2$, on which at the rear of the charger are secured levers $m^5$, which are pivotally connected, by means of rods $m^6$, with the rear side of the charger, as shown in Fig. 6. The cam M' is adjusted so that as the dies are retracted from the molds and the brick elevated above the mold on the lower dies said charger is moved forwardly, pushing the bricks upon the pallets and depositing a fresh charge in the mold as the lower dies descend and withdrawing to receive the next charge.

Means are also provided for removing from the mold-table any material remaining after charging the molds. For this purpose an air-pump is provided comprising a cylinder N of sufficient capacity provided with a reciprocating piston $n$ therein, which is connected, by means of a piston-rod $n'$, with an actuating-lever $n^2$, pivoted on a projection $n^7$ on the side frame member. The upper end of said lever is provided with an antifriction-roller $n^3$, that tracks on a cam $n^4$, secured on the shaft F', as shown in Fig. 5. A valve $n^5$ is provided in the bottom of said cylinder, and a delivery-pipe $n^6$ leads from the bottom of said cylinder upwardly into position to deliver a jet across the mold-table as the charger is retracted and the dies have entered the molds. As shown, a weight $n^8$ is secured on the piston-rod and acts to augment pressure on the air and move the piston in forcing the air therefrom.

The driving-clutch is connected with a bar P, which extends through the machine parallel with the shafts and on the opposite side of the machine thereof is connected, by means of a lever $p$, with a shaft P', journaled on the side of the frame and which extends forwardly to the front of the machine. An operating-lever $p^2$, which, if desired, may be provided with a detent to engage a suitable segment, is engaged on the front end of said shaft in operating position, whereby the driving-clutch can be quickly thrown into or out of engagement with the driving-pulley and retained as adjusted.

The operation is as follows: When the desired molds have been adjusted in the machine in register with the dies, the dies are adjusted so that the downward travel of the lower die-head is such that the dies remain in and afford a closed bottom for the molds, and to accomplish this purpose the die-head is adjusted as to height by means of the plates $h'$, provided with dowels or other means for holding them in place. These are interposed or inserted between the laterally-directed shoulders $d$ on the side bars and the bottom of the die-head, as shown in Fig. 15. In this way the lower die-head may be elevated to adjust the machine for the desired thickness of the brick when molded, which of course is determined in part by the nature of material to be treated. The adjustment of the throw or upward movement of the lower dies is accomplished by means of the coupling $g^{10}$, whereby the utmost precision of adjustment may be secured to insure the lower dies rising to the level of the top of the mold-table in discharging. A revolution of the crank-shaft F' now draws the toggle-arms into alinement, forcing the upper dies downwardly into the molds and into compressing relation with the lower dies. At the maximum compression the toggle-arms are brought into alinement, with the dies, and the lower dies being positively supported on the shoulders of the side bars the bricks are of absolute uniformity in thickness. As the crank-shaft F' continues the rotation the toggles are forced outwardly, again elevating the upper dies from the mold, and at substantially the same moment the cam G has revolved to bring the cam-track $g$ thereon into engagement to actuate the connecting-rod $G^3$ and the connected levers, thereby throwing the arms $g^5$ upwardly and lifting the lower die-head with the upper to a height equal to the thickness of the brick and bringing the bottoms of the bricks substantially flush with the top of the mold-table. The cam M' now actuates the charger, and plate $m^2$ thereon engaging behind the bricks pushes them forwardly upon the pallets and at the same time delivers its contents upon the lower dies. At the moment the bricks are clear from the dies the cam G releases the bell-crank whereby the lower dies were elevated, and a projection $x$, which I have termed a "kicker," on the cam G throws the arm, and the same being supported wholly upon the springs sinks gently but quickly down to its normal position. The material from the charger is just sufficient to mold a perfect brick in each mold, and as the dies descend the mold is filled and the charger is retracted, carrying any excess material back therewith beneath the hopper. The upper dies again descend to again engage in the mold, and when engaged in the mold and at the beginning of the compression the cam $n^4$ actuates the pump-lever to raise the piston or plunger. The weight on the piston-rod carries the piston or plunger down with sufficient speed to force a jet of air across the mold-table, blowing the excess material therefrom, and thereby preventing the unnecessary wear because of such.

Should it at any time be desired to adjust the springs $h^5$ to vary the points at which the lower dies are supported in the mold, it can readily be accomplished by means of the hand-wheel. The tension of the springs during the elevation of the lower dies can of course be regulated by means of the nut and washer on the end of the rod $h^6$. The thickness of the brick can be varied by regulating the charge and by adjusting the lower die-head relatively of the supporting-shoulders $d$ on the side bars by the insertion or removal of the spacing-blocks or plate $h'$.

The simple construction of the mold enables them to be quickly changed to produce a large variety of sizes and forms. The change is effected by slightly retracting the cap-screws $c^{17}$ and removing the nuts on the bolts $c^{13}$ and lifting the end blocks $c^7$ $c^{18}$, then the plate $c^9$, after which the desired end blocks and plates are substituted and supported on the shoulder $c^{11}$ until all are in place, when the nuts are set upon the bolts $c^{13}$ and the cap-screws $c^{17}$ are set up and the new mold secured as before.

The straight side bars D, with integral shoulders $d$ and spring $d^4$, greatly improves the mechanism, as heretofore breakage was frequent. By the present construction the maximum power ever applied to the dies is sustained wholly on said straight side bars, and the lateral shoulders and the springs serve to hold the side bars against any tendency to lift.

The various details of construction herein described are so associated and operate conjointly as to afford a very rapidly-operating easily-adjusted machine for the purpose described.

It is obvious, however, that various details of construction and operation may be varied. I therefore do not purpose limiting this application for patent otherwise than necessitated by the prior art.

I claim as my invention—

1. In a machine of the class described the combination with a frame of a mold-table rigidly supported therein, molds therein open at top and bottom, vertical side bars secured on the frame and on each side of the mold-table, a laterally-directed integral shoulder on each side and at the lower end thereof, a lower die-head slidably supported at each end on said side bars and normally resting on said shoulders, an upper die-head also slidable on the die-bar, dies on each fitted in the molds, a shaft extending through each of said side bars at its top, toggle-arms engaged thereon and on the upper die-head, means actuating said toggle-arm to bring the dies to maximum compression and a continuously-driven cam operating to elevate said lower die-head to lift the molded bricks above the mold.

2. In a machine of the class described the combination with vertical parallel side bars of an upper and lower die-head slidable thereon, integral lateral shoulders on said side bars upon which the lower die-head normally is supported, a rod secured to the lower end of each side bar and extending through the base-frame, a pulling-spring thereon and acting to hold the side bars down, coacting dies on said heads, a mold-table, open molds therein registering with the dies, each of said molds embracing forward and rear end blocks removably engaged in the mold-table, side plates engaged therebetween and bolts projecting through the mold-table into each end plate and adapted to engage the same firmly in place.

3. In a machine of the class described the combination with a suitable frame and its supporting-base of vertical side bars slidably engaged one on each side of the frame, upper and lower die-heads slidable on said slide-bars, laterally-directed integral shoulders at the lower end of each side bar upon which the lower die-head is normally supported, a mold-table extending between said die-heads, open molds therein in register with the dies and for which the lower dies afford the bottom, toggle-arms engaged on said side bars and the upper die-head acting to simultaneously operate the die-heads and means operated from the front of the machine while in operation and adapted to adjust the lower die-head to vary the charge.

4. In a machine of the class described the combination with upper and lower die-heads of vertical side bars on which said heads are slidably engaged, integral shoulders on each side bar on which the lower die-head is normally supported, operative connections with said side bars and the upper head acting to simultaneously operate said die-heads, springs adapted to support said lower die-head and adjusting mechanism positioned outside of the frame whereby the lower die-head is temporarily supported to limit the charge receivable in the molds.

5. In a machine of the class described the combination with vertical parallel side bars slidably engaged in the frame upper and lower die-heads slidable on said side bars, coacting dies thereon, a shaft connecting the upper end of said side bars, toggle-bars secured thereon and on the upper die-head, a crank-shaft operatively connected to actuate said toggle-bars, a mold-table positioned between the dies, molds open at the top and bottom and in register therewith and for which the lower dies afford the bottoms, shoulders on the side bars normally supporting said lower die-head, an automatic charger positioned to fill the molds when the upper dies are retracted and adjusting mechanism for the lower dies adapted to vary the charge received in the molds, said adjusting mechanism being positioned for operation during normal operation of the machine.

6. In a machine of the class described the combination with a side frame, and a base therefor of side bars slidably secured in the side frame, horizontal shoulders on the lower end of each side bar, upper and lower die-heads slidable on said side bars, said lower head resting on the shoulders, coacting the dies thereon, a mold-table interposed between said dies open molds therein for which the lower dies afford a bottom, an automatic charger acting to fill the molds when the upper dies are retracted, cam-operated means for elevating the lower dies with the upper to lift the article molded from the mold, resilient means limiting the descent of the lower head during charging and capable of adjustment during the normal operation of the machine for varying the charge in said molds and means interposed between said shoulders and the lower die-head acting to vary the thickness of the molded articles.

7. In a machine of the class described, a frame, parallel vertical side bars slidably secured in the frame, an integral horizontal shoulder on each side and at the lower end of each side bar affording a support for the lower die-head, a rod secured in the lower end of each side bar extending through the base of the machine and a pulling-spring thereon bearing against the base.

8. In a machine of the class described the combination with a frame of upper and lower die-heads reciprocating therein toward and from each other, vertical slide-bars slidably engaged in said frame in parallel relation and on which the die-heads are slidably engaged, a shaft secured in the upper ends of said side bars, toggle-bars engaged thereon and on the upper die-head, means engaged on the toggle acting to move the die-heads relatively of each other, lateral shoulders integral with said side bars and affording a support for the lower die-head, one or more plates adapted to be interposed between the shoulder and the lower die-head to vary the thickness of the mold, a rod secured to the lower end of each side bar and a pulling-spring thereon engaged on the base of the machine and adapted to hold the side bars down.

9. In a machine of the class described, a side bar comprising a relatively straight bar of metal having an enlarged apertured head at its upper end and one or more laterally-directed horizontal shoulders at the lower end and a spring engaged to the side bar and acting to resist upward movement.

10. In a machine of the class described straight parallel vertical side bars slidably engaged in the frame, laterally-directed integral shoulders thereon at the lower end thereof adapted to afford a support for a lower die-head and adapted to support means to adjust the die-head thereon, a rod engaged in each side bar and extending through the base-frame, a pulling-spring engaged thereon bearing upwardly against the base and a nut on said rod for adjusting the tension of said spring.

11. In a machine of the class described the combination with a frame of parallel vertical side bars, an enlarged apertured head at the upper end, laterally-directed horizontal integral shoulders at the lower end of each side bar, a rod engaged in the lower end of each and extending through the base, a spring thereon, a nut on the rod for varying the tension of the spring to resist the side bar lifting, upper and lower die-heads slidably engaged on said side bars, the lower head resting on said shoulders, mechanisms in part supported on the side bars for actuating the upper die-heads and mechanisms operated externally of the frame and independently of the compressing operation of the machine for adjusting said lower die-head in the mold to vary the charge receivable.

12. In a machine of the class described the combination with a frame of parallel vertical side bars slidably engaged on each side of the frame, a mold-table interposed between said side bars, resilient means acting to resist upward movement of said bars, removable molds in said mold-table, upper and lower die-heads slidable on said side bars, dies thereon in register with the molds, toggle-arms hung from the upper end of said side bars and engaged on the upper die-head, a main driving-shaft, a crank thereon, a rod connecting said crank with the center of the toggle, and adapted to reciprocate said upper die-head, a cam on said shaft, a bell-crank operated thereby and acting to elevate the lower dies to lift the brick from the mold as the upper die-head rises, an automatic charger positioned at the rear of the upper die-head and acting to push the brick from the dies and to fill the molds as the lower dies descend and resilient means operated externally of the frame and independently of the operating mechanisms thereon to adjust the lower die-head as to height and to vary the amount of the charge receivable in the molds.

13. In a machine of the class described the combination with a frame of a crank-shaft journaled thereon, parallel vertical side bars one on each side of the frame, laterally-directed horizontal shoulders integral therewith at the lower end of the same, upper and lower die-carrying heads on the side bars, the lower supported on said shoulders, toggle-bars, supporting the upper head on the side bars, a rod connecting said crank with the toggle, a cam on the main shaft, a bell-crank operated thereby and acting to lift the lower dies simultaneously with the upper dies thereby lifting the brick from the molds, springs bearing beneath the lower die-head, a bell-crank lever journaled below said die-head, on one side of which said springs are supported, rotative means engaging the other side of said bell-crank and acting to control the height at which the lower die-head is supported on the springs in charging.

14. In a machine of the class described the combination with yieldingly-supported side bars having shoulders thereon, of a lower die-head slidably engaged on said bars above the shoulders, springs engaged beneath the same and means adapted to vary the tension of the springs above its compressing height in charging to yieldingly support the same.

15. In a machine of the class described the combination with the lower die-head of tubular standards engaging beneath and actuating said head, springs in said standards, a bell-crank lever engaging said springs and means for adjusting said lever to vary the height of the lower dies in charging.

16. In a machine of the class described the combination with reciprocating coacting dies of a mold-table supported therebetween and comprising a forward section and a rearward section and lateral filler-blocks therebetween, bolts rigidly engaging said sections together and passing through relatively large holes in the filler-blocks, said front sections and rear sections having in their adjacent faces corresponding grooves and at the bottom thereof an inwardly-directed lip or flange, front and rear end blocks for the mold each on its outer side shaped complementally with the engaging faces of said mold-table, a bolt engaged in the outer side of each of the same and passing through a part on the table, nuts thereon engaging the same positively therewith, and side spacing-plates engaged between said end blocks and supported on said lip or flange.

17. In a machine of the class described the combination with the frame and vertical parallel side bars one on each side thereof, of an upper and a lower die-head slidably engaged thereon, means for reciprocating the upper die-head, means operated to move the lower die-head simultaneously with the upward movement of the upper die-head, a mold-table positioned between said die-heads, molds therein in register with the dies, said mold-table embracing a front and a rear section adjustable filler-blocks therebetween and through which said sections are bolted, a horizontal shoulder projecting inwardly beneath the mold from each of the sections, a horizontal groove in each section above the shoulder, end blocks for the molds, each provided with a rib on the outer side complemental with the groove and adapted to rest at their lower edge on the shoulder, a bolt secured in the outer face of each and passing through said table and rigidly engaged thereto, parallel spacing-plates engaged between the end plates and supported on said shoulder, means for adjusting the filler-blocks and a forwardly-projecting transversely-grooved end on the forward section of the mold-table adapted to receive pallets therein.

18. In a machine of the class described the combination with the upper and lower reciprocating die-heads and the dies thereon of means for actuating the dies simultaneously to compressing relation, a bell-crank lever journaled below the frame, cam-operated means engaged on one arm thereof for actuating the same during the upward movement of the upper dies, tubular posts carried on the other arm or arms and bearing beneath the lower die-head and a boss on the lower die-head engaged in each of said posts.

19. In a machine of the class described the combination with the upper and lower reciprocating die-heads and the dies thereon of means for actuating the dies simultaneously to compressing relation, a bell-crank lever journaled below the frame, cam-operated means engaged on one arm thereof for actuating the same during the upward movement of the upper dies, a part on said cam insuring quick downward movement, one or more tubular posts carried on the other arm or arms and bearing beneath and secured to the lower die-head, a second bell-crank journaled below the frame, screw-operated adjusting mechanism engaged on one arm thereof, the other arm or arms extending beneath the tubular posts, a spring in each post bearing beneath the die-head and on said arm or arms and acting when adjusted to elevate and yieldingly support said lower die-head during charging.

20. In a machine of the class described the combination with the molds of a lower die-head, means for actuating the same, embracing a crank-shaft, a cam thereon, a crank operated thereby beneath the frame, one or more arms thereon extending beneath the lower die-head, a tubular post supporting said die-head on said arms, a resilient pad secured to the lower die-head in each post, a head slidable in said post bearing on said pad, a second bell-crank journaled beneath the frame, rotative means engaging one arm thereof acting to shift the same upwardly or downwardly, the other arms of said bell-crank extending one beneath each of said posts, a spring engaged thereon and bearing against the head in said post, and acting to adjust and yieldingly support the die-head relatively of the mold in charging the molds.

21. In a machine of the class described the combination with the molds of a lower die-head, dies thereon projecting into the molds, means for actuating the die-head, embracing a main shaft, a crank operated thereby beneath the frame, parallel arms thereon extending beneath the lower die-head, tubular vertical posts pivotally supported thereon and connected with said die-head, a head slidable in each post and adapted to bear upwardly against the die-head, a lever pivoted beneath the frame, rotative means engaging one arm thereof to shift the same upwardly or downwardly the other end of said lever affording parallel arms extending one beneath each of the tubular posts, a spring engaged thereon and bearing against the slidable head in said post and acting to adjust and yieldingly support the die-head in the mold when charging above its normal compressing position.

22. In a machine of the class described the combination with the molds of a lower die-head, dies thereon fitting in the mold, means for actuating the head to elevate the dies approximately to the top of the molds embracing a main shaft, a cam thereon, a crank operated thereby and journaled beneath the frame, arms thereon extending beneath the lower die-head, a tubular post hinged to each and secured to the die-head and adapted to lift the die-head, a lever pivoted centrally beneath the frame, a screw-shaft engaging one arm thereof and acting to shift the same upwardly or downwardly, the other arm or arms of said lever being yoked and extending beneath each of said posts, a spring engaged thereon and bearing upwardly against the die-head through said post and acting by varying the elevation to yieldingly support the die-head relatively of the mold in charging and a projection on said cam acting to accelerate the descent of the die-head on the springs.

23. In a machine of the class described the combination with the molds of a lower die-head, dies thereon affording the bottom for the molds, means for actuating the die-head embracing a main shaft, a crank journaled beneath the frame operated thereby, parallel yoked arms connected therewith and extending beneath the lower die-head, tubular posts hinged to said arm and bearing beneath the die-head, a cylindric boss secured on the die-head and extending into each of said posts, a resilient pad on the lower end thereof, a head slidable in each post and bearing normally on said pad, a lever pivoted beneath the frame, a screw-shaft actuating one arm thereof to shift the same upwardly or downwardly the other end of said lever affording parallel arms and extending between the yoked ends of said arms on the crank, a spring fitted in said posts and bearing on said arms and said slidable heads in said posts and acting to adjust and yieldingly support the die-head relatively of the mold in charging and means accelerating the descent of the die-head upon the springs.

24. In a machine of the class described, the combination with molds and vertically-coacting die-heads of means adjusting the lower of said die-heads, relatively of the other embracing a bell-crank journaled horizontally beneath the frame, a nut supported on one end thereof, a threaded shaft engaged therein passing through said arm, means for rotating the shaft exterior to the frame of the machine, a spring engaged to the other arm or arms of said frame and bearing upwardly against the lower die-head, a tubular housing for each of said springs bearing against said die-head and adjustable actuating means acting to lift said lower die-head thereon, independently of said springs to bring the dies approximately flush with the tops of the molds.

25. In a machine of the class described the combination with the molds of vertical coacting dies therein, means for adjusting and yieldingly supporting the lower of said die-heads relatively of the molds in charging embracing a bell-crank journaled horizontally beneath the frame, a nut supported on one arm thereof, a threaded shaft engaged in said nut, a hand-wheel for rotating said shaft positioned exterior to the frame of the machine, a spring engaged to the other arm or arms of said bell-crank and bearing upwardly against the lower die-head, a tubular housing for each said springs acting to confine the same laterally, means acting on said housings and independently of said springs for lifting said lower die-head approximately to the top of the molds in discharging the brick therefrom.

26. In a machine of the class described the combination with the molds and vertically-coacting die-heads and the dies thereon, of means yieldingly supporting the lower of said die-heads, above its compressing position in the molds, embracing a bell-crank journaled horizontally beneath the frame, a nut supported on one arm thereof, a threaded shaft engaged therein, passing through said arm, means exterior to the frame of the machine for rotating said shaft independent of the operation of the machine, parallel arms on the other side of said bell-crank, a spring on each bearing upwardly against the lower die-head, a tubular post affording a housing for each spring acting to confine the same, and positively connected with said die-head and adjustable means operatively connected with said tubular post or housing acting independently of said springs to lift and to support said die-head after compression and to discharge the molds.

27. In a machine of the class described the combination with the molds and vertically-coacting die-heads and the dies thereon of means adjusting the lower of said die-heads relatively of the molds embracing a bell-crank journaled horizontally beneath the frame, a nut supported on one arm thereof, a vertical threaded shaft exterior of the frame engaged therein and passing through the forked end of said arm, means for rotating the shaft independently of the operation of the machine, a spring engaged to the other arm or arms of said bell-crank and bearing upwardly against the lower die-head, means adjusting the tension of said springs, a tubular post or housing for each spring acting to confine the same laterally and positively connected with the lower die-head, a shaft actuating the upper die-head, a cam thereon, a crank connected with the tubular posts and an adjustable connection between said cam and crank affording means for elevating the lower head independently of said springs.

28. In a machine of the class described the combination with the molds, the lower die-head and the dies in register with the mold and affording a bottom therefor of adjustable means elevating said dies above the mold, embracing a main shaft, a cam thereon, a rod adjustable as to length operated by the cam, a bell-crank journaled beneath the frame and with one arm of which said rod is connected, two parallel arms on the opposite side of the bell-crank and vertically slotted longitudinally thereof at their ends and extending beneath the lower die-head, tubular supports connected with the bottom of said die-head, laterally-directed bosses on said tubular supports at the lower end thereof corresponding in width with the width of the arms, links pivotally connecting said arms with said bosses, a boss on the die-head projecting into each tubular support, a resilient pad at the lower end thereof, a lever pivoted below said arms, arms thereon extending beneath and in alinement with the slotted end of the arms on said bell-crank, a spring on each arm extending upwardly in said tubular supports and against the lower head, a nut on the oppositely-directed arm, a screw-shaft journaled on the outer end of the frame, and a hand-wheel for rotating the same for adjusting the said springs to elevate and yieldingly support said die-head during charging.

29. In a machine of the class described the combination with the molds and the coacting upper and lower die-heads of an automatic charger, means delivering an air-blast over the mold-table after the dies are engaged, means acting to elevate the upper die-head and the lower simultaneously bringing the brick to the top of the molds, resilient means operated externally of the machine, adapted to limit the charge delivered to the molds and means adjusting the downward travel of the lower head in compressing.

30. In a machine of the class described a lower die-head, shouldered side bars affording a rigid support therefor from downward movement, positively-actuated tubular columns acting to lift said head at the end of the compression to discharge the brick, a spring in each tubular column adapted to yieldingly support the head during charging and means independent of said columns for simultaneously varying the elevation at which said springs support the die-head thereby enabling the charge to be regulated during operation of the machine.

31. In a device of the class described the combination with a frame of side bars slidably engaged therein, resilient means connecting the lower ends of said side bars with the frame, a mold-table carried on the frame, upper and lower die-heads slidably engaged on said bars, dies thereon, a crank-shaft, means thereon adapted to operate the upper die-head, a bell-crank pivoted beneath the frame, means connecting one arm of said crank with the lower die-head, an adjustable shaft connected with the other arm of said lever, a bell-crank lever pivoted on the frame and connected with said shaft, a cam-wheel carried on the crank-shaft and adapted to operate said bell-crank to elevate the lower die-head and a projection on said cam-wheel adapted to throw said die-head downwardly at the end of the compressing movement.

32. In a device of the class described the combination with a frame of vertical side bars slidably engaged thereon, a mold-table rigidly engaged on the frame, upper and lower die-heads slidably engaged on said side bars, dies thereon means for operating said die-heads, an air-pump, a pipe leading therefrom to the mold-table and means adapted to operate said pump and intermittently force a blast of air on the table.

33. In a device of the class described the combination with a frame of vertical side bars slidably engaged thereon, upper and lower die-heads slidably engaged on said bars, a crank-shaft, means operatively connecting said crank-shaft with the die-heads, a mold-table, an air-pump carried on said frame, a pipe leading therefrom to the mold-table, a lever connected with said pump and a cam carried on said crank-shaft and adapted to operate said lever.

34. In a device of the class described the combination with a frame of side bars slidably engaged thereon and provided with laterally-directed shoulders on their lower ends resilient means limiting the upward movement of said bars, an upper and a lower head slidably engaged on said bars, means on said shoulders adapted to limit the lower movement of the lower head, a shaft rigidly engaged in the upper ends of said side bars, toggle-levers connecting said shaft with the upper die-head, a crank-shaft journaled in the frame, a connecting-bar connecting said crank-shaft with the toggle, a shaft journaled beneath the frame, a bell-crank lever thereon, means connecting said lever with the lower die-head, an adjustable shaft connected with said bell-crank lever, a bell-crank lever pivoted on the frame and connected with the upper end of said shaft and a cam-wheel engaged on said crank-shaft and adapted to operate said bell-crank lever to elevate the lower die-head.

In testimony whereof I have hereunto subscribed my name in the presence of two subscribing witnesses.

PETER L. SIMPSON.

Witnesses:
C. W. HILLS,
W. W. WITHENBURY.